F. E. WHITLATCH.
AEROSTRUCTURAL BALANCE.
APPLICATION FILED MAR. 18, 1911.
1,030,363.
Patented June 25, 1912.
3 SHEETS—SHEET 1.
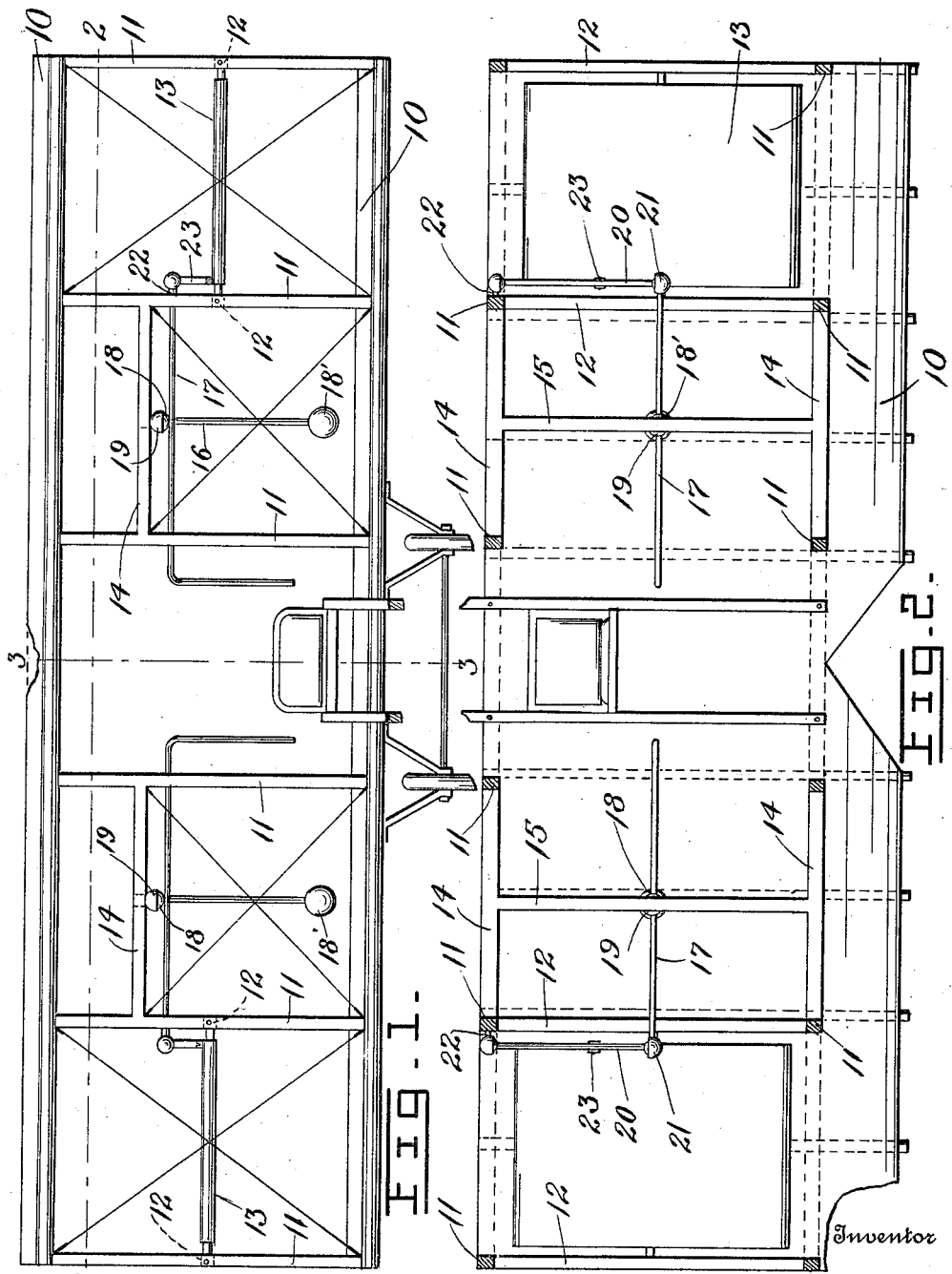

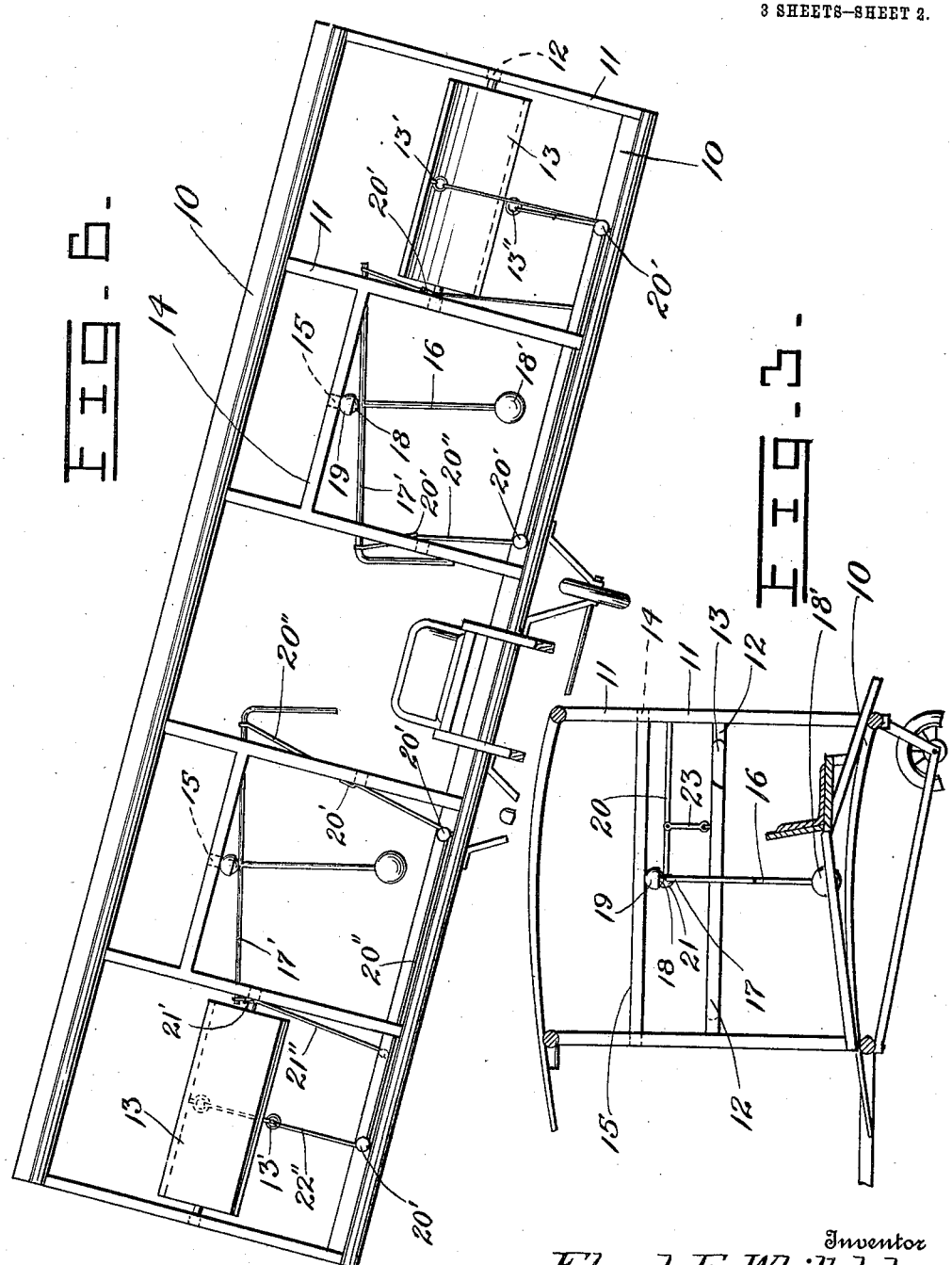

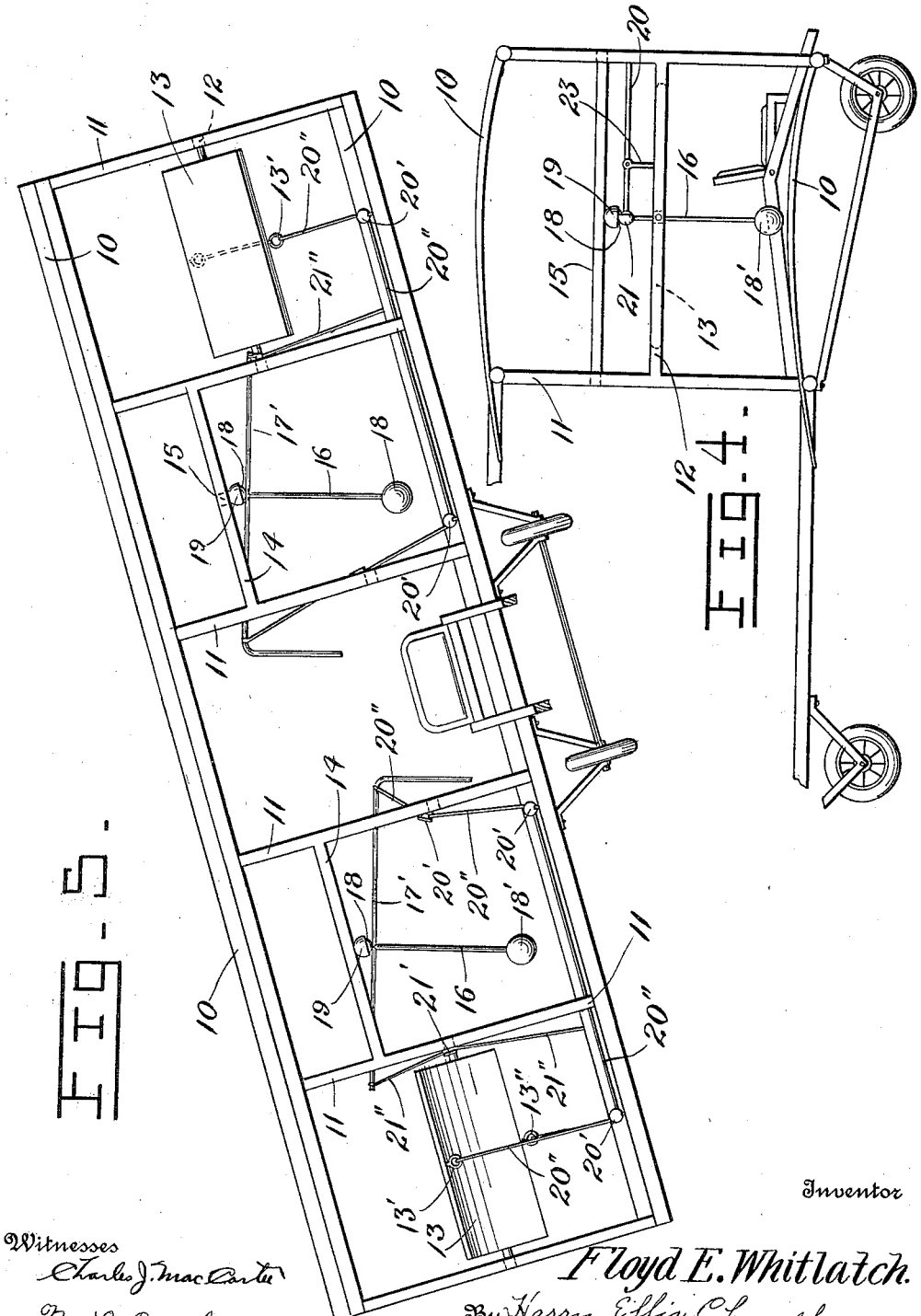

UNITED STATES PATENT OFFICE.

FLOYD E. WHITLATCH, OF WINDSOR, ILLINOIS.

AEROSTRUCTURAL BALANCE.

1,030,363.   Specification of Letters Patent.   Patented June 25, 1912.

Application filed March 18, 1911. Serial No. 615,223.

*To all whom it may concern:*

Be it known that I, FLOYD E. WHITLATCH, a citizen of the United States, residing at Windsor, in the county of Shelby and State of Illinois, have invented certain new and useful Improvements in Aerostructural Balances, of which the following is a specification.

This invention relates to improvements in aeroplane structures, and more particularly to balancing means therefor.

An object of the invention is to provide means whereby aeroplanes may be balanced during flights.

Another object of the invention is to provide means connected to the side wings, or balancing planes for automatically operating the latter to balance the machine.

A further object of the invention is to provide means for automatically controlling the balancing plane of an aeroplane to right the machine.

A still further object is to provide means connected to the balancing planes of a flying machine for automatically controlling each balancing plane.

A still further object is to provide independent means connected to each balancing plane for automatically operating each plane independently of the other planes to balance the aeroplane should either side drop below normal position, and a still further object is to provide a balancing means of the above described character which may be applied to machines already in use.

Other objects and advantages will be apparent from the following description, and it will be understood that changes in the specific structure shown and described may be made within the scope of the claim without departing from the spirit of the invention.

In the drawings: Figure 1 is a front elevational view of an ordinary aeroplane with my balancing mechanism connected to the balancing planes thereof, parts of the aeroplane being broken away, Fig. 2 is a sectional view on the line 2—2 of Fig. 1, Fig. 3 is a vertical sectional view on the line 3—3 of Fig. 1, Fig. 4 is an end view at right angles to Fig. 1, Fig. 5 is a view similar to Fig. 1 showing the position of the balancing mechanism and the planes of the machine when the left-side of the machine drops below normal position, showing the modified means of connection between the balancing mechanism and the balancing planes, Fig. 6 is a view similar to Fig. 5 showing the position assumed by the balancing mechanism and the position to which the balancing planes are operated by said mechanism, when the right-side of the machine drops, to automatically right the machine.

Referring more particularly to the drawings, 10 designates the upper and lower planes of an ordinary aeroplane, which are connected by the usual standards 11. Extending from the front to the rear of the machine and connected to certain of the standards 11 are the horizontal brace bars 12 to which are pivoted the side wings or balancing planes 13 for balancing the aeroplane. Connected to other of said standards 11 are horizontal bars 14 and 15. A pendulum 16 rigidly secured to a cross bar 17 at its upper end carries a weight 18' upon its lower end. The bar 17 is connected to the cross rod 15 by means of a universal joint connection such as a ball 18 and socket 19. One end of the bar 17 is secured to the rod 20 by a ball and socket arrangement 21 such as above described, and the bar 20 is similarly secured at its other end to the arm 22 of the standard 11. Near the center of the bar 20 is pivoted the upper end of the connecting rod 23 which has its lower end pivoted to the balance plane 13 slightly to one side of the axis of the plane. It will be noted that the rod 15 is near the upper main plane 10 while the balancing plane is positioned about mid-way of the planes 10. It will be noted that should the machine tilt downwardly to the right, the weight 18 of the right-hand pendulum 16 will swing toward the right end of the machine, swinging the free end of the rod 17 in a downward direction and the opposite end in an upward direction, and thus operating the rod 20 to lift the connecting rod 23 which will cause the balancing plane 13 to tilt so as to present its under side or surface to the wind, while the pendulum at the left side of the machine swings and operates the rod connected thereto to tilt the balancing planes 13 on the left side of the machine in an opposite direction to present the upper surface thereof to the wind. It will thus be seen that as the wind strikes the under surface of the right balancing plane and the upper surface of the left balancing plane and works against these surfaces, the result will be that the right side will be lifted while the left side glides downwardly until the machine is returned to its former position and the pendulum 16 with their weights 18 rest in their former, or a perpendicular position. It will be readily seen that, should the left side of the machine drop below normal position, the pendulum will swing to positions opposite to those assumed when the right side drop (as just described) and will operate the balancing planes so as to present the under surface of the left plane and the upper surface of the right side to the wind, which will cause the wind or air current to raise the left side of the machine while the right side glides downwardly until the machine is again in normal position and the pendulums are again at rest in a perpendicular position. It will be noted that by means of the ball and socket connections 18 and 19 and 21 the pendulums are allowed to swing in a forward and rearward direction as well as to either side, and by means of this arrangement they will always be in a perpendicular position during the ascension and descension of the machine as well as when the machine is flying in a straight forward direction.

In Figs. 5 and 6 is shown a modified arrangement of the connections between the pendulum and the balancing planes. In this arrangement the connecting rods 20, 22 and 23 are replaced by pulleys 20' and 21' and cables 20'' and 21''. The cable 20'' is connected to one end of the cross bar 17' and passes over or around the pulleys 20' and has its opposite end secured to the tilting edge 13' of the tilting plane 13; while the cable 21'' has one end secured to the opposite end of the cross bar 17' and it passes around the pulleys 21' and has its other end secured to the rear tilting edge 13'' of the balancing plane 13. This arrangement of connections between the pendulum and the balancing plane will serve to automatically operate the plane in the same manner as above described.

The cross bars 17 may have their free ends extended to within reach of the operator, to be operated by him should the pendulums fail to respond instantly when either side drops. But, this should not be necessary as the weights will readily swing the pendulum rods 16 to a perpendicular position.

It will be noted that the balancing mechanism for each balancing plane is separate and independent from the other balancing plane or planes and all other parts of the machine, and will work independently of the remainder of the machine. This balancing mechanism does not necessitate any changes or alterations whatever in aero-planes now in use, nor is it necessary to construct a machine especially for this balancing mechanism. It may be readily applied to the aero-planes of various types now in use. As this balancing mechanism automatically balances the machine, the operator is relieved of the necessity of manipulating the levers by hand or even swaying his body to right the machine and keep the same balanced.

What is claimed is:

A balancing mechanism for aeroplanes, consisting of a pendulum rod having a weight at its lower end and a cross bar at its upper end extending at right angles, said cross bar being connected at its center to a cross bar of the aeroplane by means of a ball and socket connection, a swinging rod having one end secured to an arm carried by one of the standards of the machine and its opposite end connected with one end of the said cross bar, and a lifting rod connected to said swinging rod and the balancing plane of the machine for automatically operating said balancing plane.

In testimony whereof I affix my signature, in the presence of two witnesses.

FLOYD E. WHITLATCH.

Witnesses:
E. P. BENNETT,
J. C. BATSON.

---

Copies of this patent may be obtained for five cents each, by addressing the "Commissioner of Patents, Washington, D. C."